Figure 1:
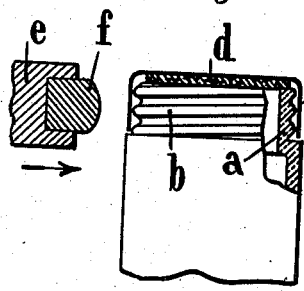

A. WILZIN.
METHOD OF SCREW CAPPING BOTTLES.
APPLICATION FILED FEB. 6, 1907.

937,401.

Patented Oct. 19, 1909.
2 SHEETS—SHEET 1.

Witnesses.
Inventor
Arthur Wilzin
By Briesen&Knauth
Attorneys.

A. WILZIN.
METHOD OF SCREW CAPPING BOTTLES.
APPLICATION FILED FEB. 6, 1907.

937,401.

Patented Oct. 19, 1909.
2 SHEETS—SHEET 2.

Witnesses.
Julius Ruth
John A. Kehlenbeck

Inventor
Arthur Wilzin
By Briesen & Knauth
Attorneys.

UNITED STATES PATENT OFFICE.

ARTHUR WILZIN, OF CLICHY, FRANCE.

METHOD OF SCREW-CAPPING BOTTLES.

937,401.  Specification of Letters Patent.  Patented Oct. 19, 1909.

Application filed February 6, 1907. Serial No. 355,986.

*To all whom it may concern:*

Be it known that I, ARTHUR WILZIN, of 4 Rue Huntziger, Clichy, Seine, Republic of France, engineer, have invented a Method of Screw-Capping Bottles and other Receptacles, of which the following is a full, clear, and exact description.

The present invention relates to a method of closing glass and porcelain bottles, jars or the like by means of sheet metal screw caps in such a way as to embody the following points which are essential for the practical and industrial application of screw cap closures for wine, beer, mineral- and soda-water bottles, etc., also to certain classes of preserve jars, and the like.

The characteristic advantages of my invention which cannot be obtained by the use of the screw capping systems known up to date are:

1. My cap may be instantly slipped over, and rapidly attached to the screwed neck of the bottle, instead of having to be slowly screwed on the same. The slowness of this screwing operation has rendered the usual screw cap closure impossible for charged waters and industrially impracticable for most other bottling purposes.

2. A strong initial pressure (such as is usually exerted by a straight-line motion in capping machines) may be brought to bear on the cap and the joint beneath it, thus insuring a much greater degree of tightness than may be obtained by screwing an ordinary screw cap home against the joint.

3. The operation of shaping the screw threads of the cap is accomplished against the threaded or corrugated neck of the bottle itself, which serves as a matrix for the purpose, and this shaping process takes place while the cap and joint are being held under pressure from above. In this way, a powerful hold of the cap on the neck is assured and a perfect fit of the cap threads against the bottle threads, notwithstanding the irregularities which are unavoidable in the molding process of glass or porcelain necks.

4. The usual operation of shaping the screw threads on the cap by means of a special machine after the stamping and before the application on the bottle neck is done away with, thus saving that part of the machinery outfit, simplifying the manufacture and decreasing the cost.

5. My cap is so locked on the bottle neck that it cannot jar loose by shock or trepidation in handling and transport.

6. The locking feature of the cap must be destroyed in order to open the bottle, thus insuring inviolability of the closure, while permitting a rapid and effective use of the cap for temporary reclosure, a feature of great importance and which is not found in any other inviolable sheet metal cap.

My method of capping which renders the above points feasible is essentially characterized by the fact that the screw threading of the cap is molded either wholly or in part upon the screw thread of the neck of the bottle or other receptacle in such manner that the cap adapts itself exactly to the neck of the bottle. The method of capping consists in slipping a plain cap or one upon which the screw threads have already been partly produced, over the neck of the bottle or other receptacle and exerting pressure upon its circumference in such manner as to cause the metal of the cap to take the impression of the thread of the neck of the bottle which thus constitutes a matrix. Before this molding pressure is exerted the cap and receptacle are interlocked against relative rotation, means to effect such interlocking being provided as hereinafter described.

The manner of carrying out the invention will be described with reference to the accompanying drawing, wherein—

Figure 2:
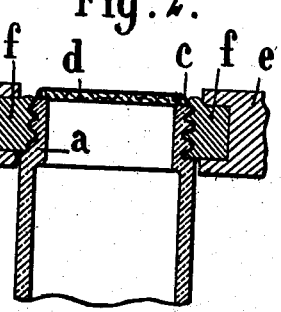
Figure 3:
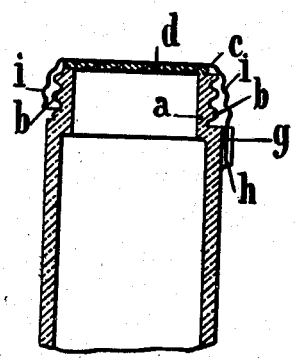
Figure 4:
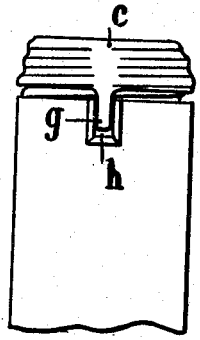
Figure 8:
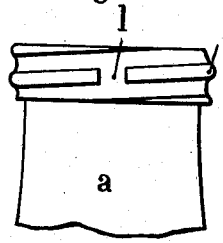
Figure 5:
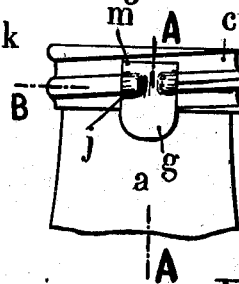
Figure 6:
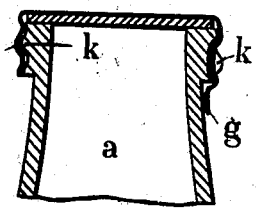
Figure 9:
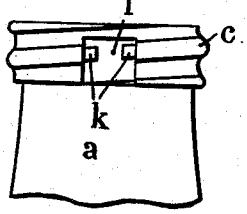
Figure 7:
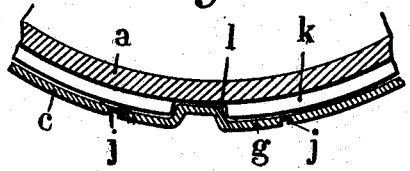

Figures 1 and 2 show a preferred form of cap having a plain circumference or flange, while Figs. 3 and 4 show a modified form of cap which may be used with my invention, said cap having upon its flange partly formed screw threads or corrugations. Figs. 5 to 9 show various forms of caps adapted to be used according to my invention and embodying an inwardly projecting locking-member adapted to engage with a notch in the neck of the bottle; Fig. 5 shows a face view of the cap upon the neck of the bottle; Fig. 6 is a vertical section on line A—A of Fig. 5; Fig. 7 is a horizontal section on line B—B of Fig. 5 (drawn to an enlarged scale) showing the cap locked into the notch of the bottle; Fig. 8 shows the neck of the bottle in elevation and Fig. 9 shows the cap after the removal of the locking-member which holds the cap in place.

Figure 16:
Figure 17:
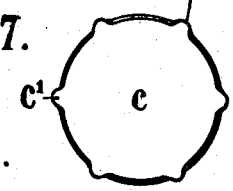
Figure 18:
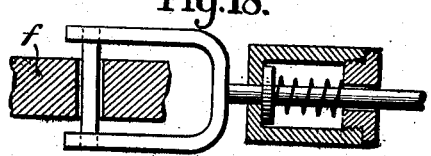
Figure 12:
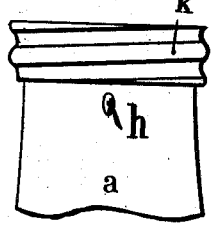
Figure 10:
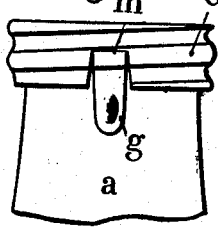
Figure 11:
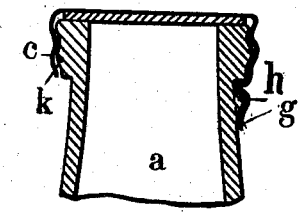
Figure 15:
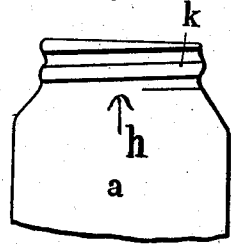
Figure 13:
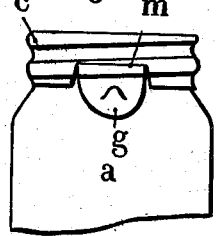
Figure 14:
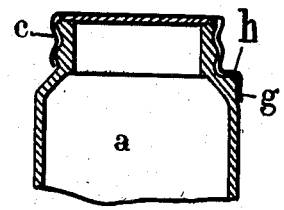

Figs. 10 and 11 show in elevation and in vertical section a construction in which the bottle is provided with a locking-boss beneath the screw threads. Fig. 12 shows a corresponding elevation of the neck of the bottle. Figs. 13, 14 and 15 show constructions in which this improved screw capping method is applied to fruit-jars. Figs. 16 and 17 show in elevation and in plan a cap provided with ribs. Fig. 18 illustrates a modification of the cap-fastening apparatus.

As will be seen by reference to Fig. 1, in carrying out the method, I apply to the neck of the bottle or other receptacle $a$, having a screw thread $b$, a plain stamped cap $c$; a packing disk $d$ (for instance of cork) is interposed between the neck and the head of the cap. The neck of the bottle thus covered by its cap is then presented to devices adapted to apply pressure against the circumference of the neck, such as jaws or rolls $e$. These jaws or rolls may be made of steel or provided with an elastic substance $f$ (india-rubber, leather, etc.) and are susceptible of being moved in the direction of the arrows, so as to apply to the cap the requisite pressure (as shown in Fig. 2). The jaws or rolls may receive, at the moment when they exert the pressure upon the neck, a rotary movement around the latter, or the bottle or other receptacle may receive a rotary movement at the moment when the jaws or wheels come into contact with it in such manner that the edge of the cap is shaped all along its circumference against the neck of the bottle. In the case of using solid grooved jaws or rolls, not provided with an elastic pressure covering, the elasticity required to compensate for irregularities in the shape and size of the neck may be provided by interposing spring cushions at some convenient point between the members which actuate the pressure motions as indicated in Fig. 18.

When the cap is made of thin and pliant metals (such as aluminium, brass, tinplate) the pressure may be imparted directly to a plain cap as has been above described. On the other hand when the metal in the cap is comparatively thick or hard, it may become necessary to stamp the cap with a preparatory thread on its edge, which edge, in this case should be slightly tapering as shown in Figs. 3, 4, in order that the cap may be freely slipped over the neck. The pressure subsequently applied to the flange of the cap will then complete the shaping of the screw thread and cause the helical grooves previously formed upon the edge to exactly conform themselves to the screw threads on the bottle neck.

The cap should preferably be formed with a tongue $g$ (Figs. 3 and 4) which will drop into notch $h$, when the cap is applied to the neck, or between two lugs formed on the body of the receptacle. The placing of this tongue $g$ in the notch $h$ insures the requisite position of the cap, so that the partially formed grooves $i$ will correspond with the threads on the neck of the bottle ready to be pushed into same when pressure is brought to bear against the flange of the cap. That is to say after the cap has been slipped axially on the bottle neck, the tongue $g$ is placed in the notch $h$, so as to lock the cap against rotation, and then (while an axial downward pressure is being exerted on the cap so as to compress the packing disk $d$) the cap-fastening or molding apparatus is operated to force the cap into close contact with the screw-thread of the bottle.

The locking tongue $g$ may be entirely lodged in the edge of the cap by means of two incisions $j$ or by two lines of weakness, but it should preferably be extended (as per Figs. 5 and 6) below the edge of the cap in order to facilitate its being taken hold of by the fingers. The screw thread $k$ on the neck $a$ of the bottle is interrupted as at $l$ (Figs. 7, 8, 9), so as to permit of an inwardly projecting dent on $g$ to engage with it and thereby prevent the cap from turning on the neck before $g$ is removed. A line of weakness $m$ may be provided, connecting the two lines $j$ for the purpose of easily tearing off $g$ when it is raised and disengaged from the notch in the neck of the bottle in order to unscrew the cap. The screw thread $k$ of the neck of the bottle need not, however, be interrupted. The receptacle may instead be formed with a projection $h'$ (Figs. 10-15) upon which a corresponding concave portion on the tongue $g$ may be applied, so as to lock the cap in its position. Instead of this projection $h'$, the receptacle may also be provided with a cavity in which a convex portion of the tongue $g$ is received.

When the cap $c$ is applied to the neck of the bottle or jar and the locking tongue $g$ is engaged as shown in Figs. 3, 4, 5, 6, 10, 11, 13 and 14, the cap cannot turn or unscrew by reason of trepidations or shocks to which it may be subject during transport or handling, so that a safe closure of the bottle is insured.

To open the bottle or other receptacle, the consumer raises the tongue $g$ in order to disengage it from the notch in the threaded portion as shown in Figs. 5 and 6, or from the notch $h$ as shown in Figs. 3, 4, or the projection $h'$ shown in Figs. 10, 11, 13 and 14, and the tongue $g$ being thus raised will be broken off along the line of weakness $m$. The cap $c$ may then be unscrewed. The body of the cap $c$ which is to be molded upon the screw-thread of the neck of the bottle or other receptacle can be provided with ribs $c'$ arranged, as shown in Figs. 16 and 17, according to the generatrices of this cap (that is, vertically) and adapted to afford a better hold when unscrewing. These ribs or ridges also present the advantage that they render the cap expansible and contractile within certain limits, so that it may fit the bottle or other receptacle properly, notwithstanding variations or inaccuracies in the diameter and form of the neck. The consumer may temporarily and effectively close the bottle again by means of the same cap, but the removal or deformation of the tongue $g$ prevents its being used again commercially and the method is as a consequence adapted to prevent fraud.

My invention permits of closing bottles with screw caps very rapidly, as it does away with the necessity of screwing the cap on the bottle when being applied, and the closure may be effected by very simple mechanical means.

This method of capping may, of course, be applied to all kinds of receptacles for which it is adapted.

Claims:

1. The method of applying flanged caps to receptacles provided with corrugations which consists in slipping the cap axially of the receptacle, positively interlocking the parts against rotation and then pressing the flange of the cap radially against the receptacle to mold said flange upon said corrugations.

2. The method of applying flanged caps to receptacles provided with corrugations which consists in slipping the cap axially of the receptacle, positively interlocking the parts against rotation and then pressing the flange of the cap radially against the receptacle to mold said flange upon said corrugations while also pressing the cap axially against said receptacle.

3. The method of applying flanged caps to receptacles provided with corrugations which consists in slipping the cap axially of the receptacle, positively interlocking the parts against rotation and then pressing the flange of the cap inwardly against the receptacle to mold said flange upon said corrugations.

4. The method of applying flanged caps to receptacles provided with corrugations which consists in slipping the cap axially of the receptacle, positively interlocking the parts against rotation and then applying a circumferentially shifting radial pressure to the flange of the cap so as to mold the same upon said corrugations.

5. The method of applying flanged caps to receptacles provided with corrugations which consists in slipping the cap axially of the receptacle, positively interlocking the parts against rotation and then applying a circumferentially shifting radial pressure to the flange of the cap so as to mold the same upon said corrugations while also pressing the cap axially against said receptacle.

6. The method of applying flanged caps to receptacles provided with corrugations which consists in slipping the cap axially of the receptacle, positively interlocking the parts against rotation and then applying a circumferentially shifting inward pressure to the flange of the cap so as to mold the same upon said corrugations.

7. The method of applying flanged caps to receptacles provided with corrugations which consists in bringing said flange and said corrugations into juxtaposition, positively interlocking said cap and said receptacle against rotation and then applying radial pressure to the flange to mold the same upon said corrugations.

8. The method of applying flanged caps to receptacles provided with corrugations which consists in bringing said flange and said corrugations into juxtaposition, positively interlocking said cap and said receptacle against rotation and then molding said flange upon said corrugations.

9. The method of applying flanged caps to receptacles provided with corrugations which consists in bringing said flange and said corrugations into juxtaposition, positively interlocking said cap and said receptacle against rotation and then molding said flange upon said corrugations while also pressing the cap axially against said receptacle.

10. The method of applying flanged caps to receptacles provided with corrugations which consists in bringing said flange and said corrugations into juxtaposition, positively interlocking said cap and said receptacle against rotation, and then molding said flange upon said corrugations said molding being simultaneous for each and all of the corrugations.

11. The method of applying flanged caps to receptacles provided with corrugations which consists in bringing said flange and said corrugations into juxtaposition, positively interlocking said cap and said receptacle against rotation and then simultaneously forming upon said flange a number of corrugations to fit and engage the corrugations of the receptacle while also exerting axial pressure between said cap and said receptacle.

The foregoing specification of my method of screw capping bottles and other receptacles signed by me this 19th day of January, 1907.

ARTHUR WILZIN.

Witnesses:
  HANSON C. COXE,
  MAURICE H. PIGNET.